Sept. 19, 1939.　　　　E. M. SPLAINE　　　　2,173,670
OPHTHALMIC MOUNTING AND METHOD OF MAKING SAME
Filed Dec. 28, 1936　　　3 Sheets-Sheet 1
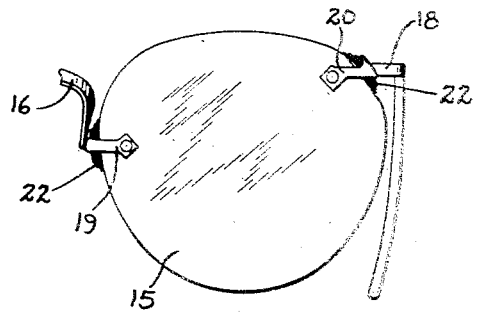
FIG. I
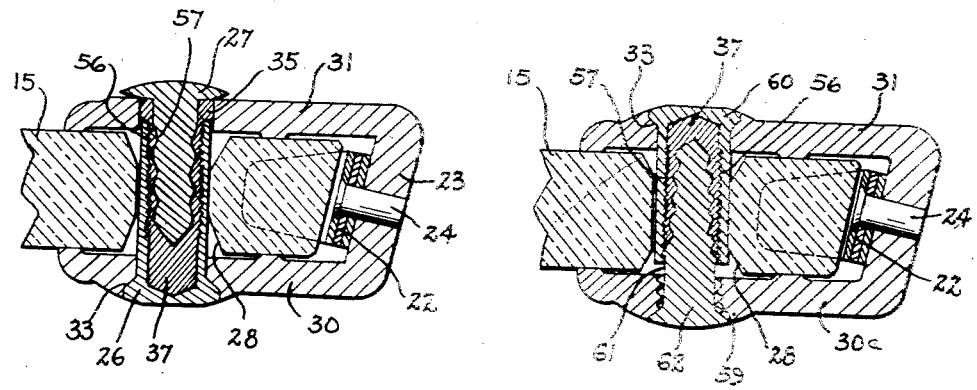
FIG. II　　　　FIG. III
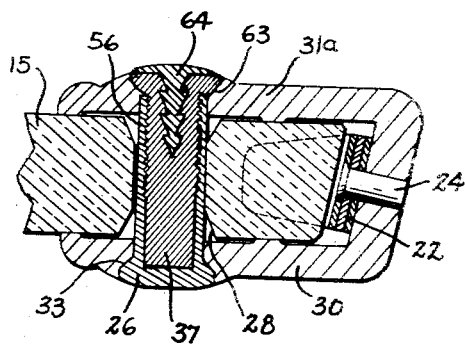 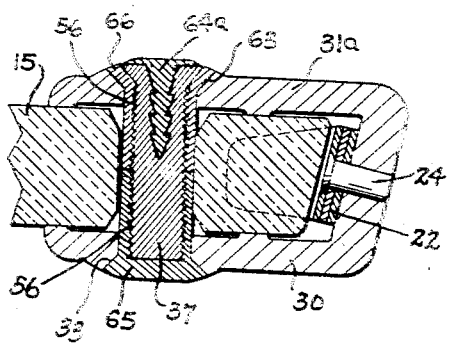
FIG. IV　　　　FIG. V
INVENTOR
EDWARD M. SPLAINE
BY
Harry H. Styll
ATTORNEY Sept. 19, 1939.  E. M. SPLAINE  2,173,670
OPHTHALMIC MOUNTING AND METHOD OF MAKING SAME
Filed Dec. 28, 1936  3 Sheets-Sheet 2
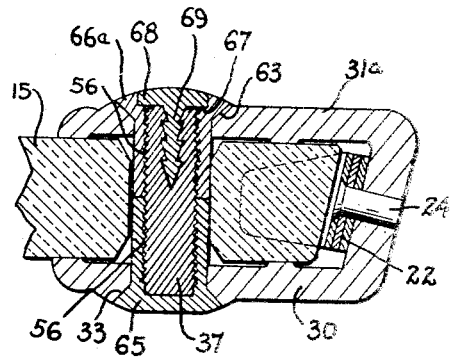
FIG. VI
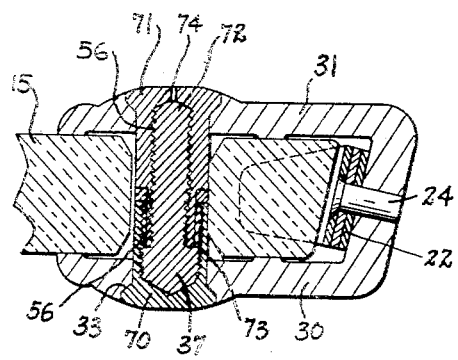
FIG. VII
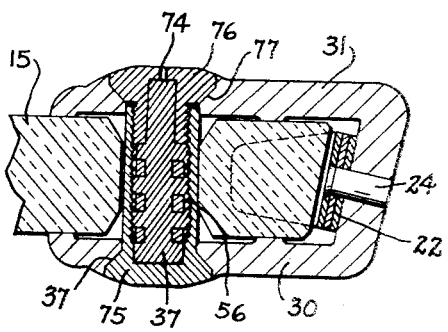
FIG. VIII
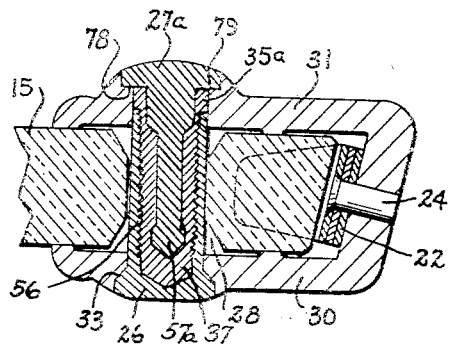
FIG. IX
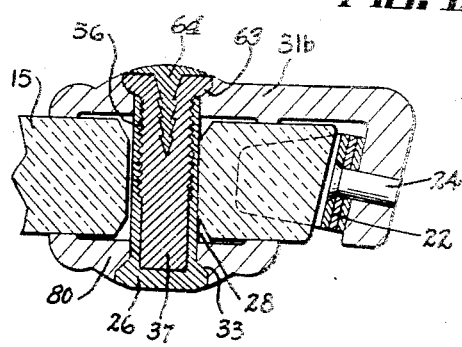
FIG. X
INVENTOR
EDWARD M. SPLAINE
BY
Harry H. Styll
ATTORNEY Sept. 19, 1939.  E. M. SPLAINE  2,173,670
OPHTHALMIC MOUNTING AND METHOD OF MAKING SAME
Filed Dec. 28, 1936  3 Sheets-Sheet 3
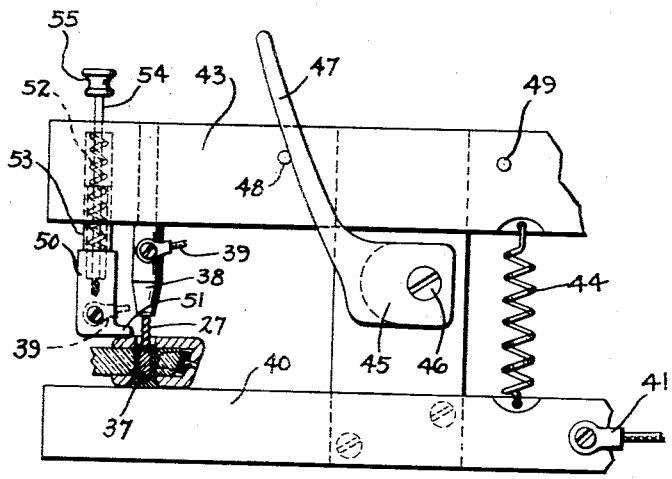
FIG. XI
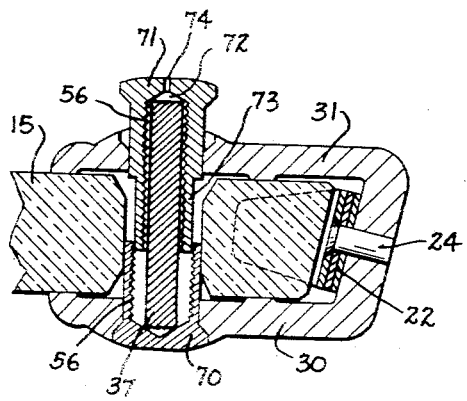
FIG. XII
INVENTOR
EDWARD M. SPLAINE
BY
Harry H. Styll
ATTORNEY Patented Sept. 19, 1939

2,173,670

UNITED STATES PATENT OFFICE 2,173,670

OPHTHALMIC MOUNTING AND METHOD OF MAKING SAME

Edward M. Splaine, Southbridge, Mass., assignor to American Optical Company, Southbridge, Mass., a voluntary association of Massachusetts Application December 28, 1936, Serial No. 117,854

13 Claims. (Cl. 88—47)

This invention relates to improvements in the uniting of parts of an ophthalmic mounting. More particularly the invention relates to the attachment of a lens in such a way as to leave it free for slight pivotal movement while having the advantages of a connection embodying fusible material.

An object of the invention is to render the connection tenacious and relatively permanent without so fixing the lens as to interfere with the use of cushioning means such as a leaf spring.

In the accompanying drawings which illustrate my invention:

Fig. I is a front view of one-half of an ophthalmic mounting; the bridge and temple being conventionally shown.

Fig. II is a detail sectional view through means for uniting a lens and another part of the ophthalmic mounting, in accordance with my invention.

Figs. III to X inclusive are similar views of other forms of my invention.

Fig. XI is a schematic view showing how the uniting of the parts may be accomplished.

Fig. XII is a detail view similar to Fig. VII illustrating the relation of certain of the parts in preparation for locking them together.

The invention is of particular importance in connection with so called "rimless" ophthalmic mountings; and such a mounting is illustrated in Fig. I in which a lens 15 is shown attached to a bridge 16 and to an endpiece and temple 18. As there is no eye wire for clamping the lens 15 in position, means are provided at 19 for attaching the lens to the bridge and means are provided at 20 for attaching the lens to the endpiece and temple 18. Closely similar problems are involved in the two devices 19 and 20 for attaching the lens 15. For convenience it will be assumed that the remaining figures of the drawings illustrate device 20. However, it will be understood that the device 19 may be constructed according to one of the forms of my invention and the device 20 according to another form.

Devices of this character employing a heat softenable material for providing a relatively permanent connection tend to more rigidly grip the lens than the well known type in which a screw extends through a perforation in the lens to hold the latter. This is partly because when the screw type mounting is made up, it is possible to adjust its rigidity by the tightness of the screw. In contrast to this, the heat softenable material, upon rehardening, tends to provide a rigid connection. This disadvantage has been alleviated by interposing one or more leaf springs 22 between shank 23 of the attachment and the edge of the lens, the spring or springs being secured to the shank by a rivet 24. The full effectiveness of this cushioning arrangement is lost if the lens 15 cannot shift in the attachment. In other words, the purpose of the spring or springs 22 is to yieldingly oppose such shifting movement, although there is no positive connection with the lens 15 for preventing such shifting movement.

In accordance with my invention I provide a construction in which such movement is permitted while retaining the advantages of a construction embodying heat softenable material for rendering the connection permanent. In Fig. II is shown an embodiment of my invention in which a sleeve or container 26 and a pin 27 constitute telescoping members which cooperate with the perforation 28 in the lens 15 for securing the latter. In the particular illustrative embodiment shown in this figure there are two straps 30 and 31; but in this and in the following forms it is to be understood that a single strap type of attachment such as illustrated in Fig. X, may be substituted for the two strap type.

In the form illustrated in Fig. II, the sleeve 26 is closed by a head accommodated in a countersink 33 in the outer end of the perforation in the strap 30. The other strap 31 is provided with a perforation 35 just large enough to accommodate the open end of the sleeve or container 26. I prefer that the sleeve 26 be long enough to enter the perforation 35. It may be found desirable to keep in stock extra-long sleeves 26 for use where unusually thick lenses are to be mounted. Normally, variation in thickness in the lens can be accommodated by the ability of the members 26 and 27 to telescope to varying extents. It will be noted that the head of the pin 27 does not extend substantially into the perforation 35, and therefore the sleeve 26 can take up a difference in thickness in the lens substantially equal to the thickness of the strap 31. If considerable variation is desirable, this strap 31 may be increased in thickness, as this affords a longer perforation 35.

Fig. XI illustrates how the uniting of the parts may be accomplished, the size of the mounting being considerably exaggerated relative to the scale of the remainder of the figure. The pin 27 rests on top of the heat softenable material 37 such as solder, and electrode 38 rests on top of the head of the pin 27 with a direct pressure. One of the leads carrying the electric current for heating and softening the solder 37 is connected to electrode 38. This lead is numbered 39. The other electrode 40 constitutes the table on which the mounting rests, and the lead 41 is electrically connected to the table 40. The electrode 38 may conveniently be fixed in a press member 43 which is pulled toward the table 40 by a relatively strong spring 44 insulated to prevent its carrying the electric current. The press member 43 is maintained in retracted position by a cam 45 which the operator can swing about its pivot 46 by an operating lever 47 having an arc of swing limited by stop pins 48 and 49. The outer end of the press member 43 carries a spring pressed plunger 50 whose foot 51 serves to lightly engage and hold in place the mounting being assembled or disassembled. The spring 52 for biasing the plunger downwardly, which is a relatively light spring, is contained in a bearing sleeve 53 and surrounds a lifting rod 54 fixed in the plunger 50. A knob 55 is fixed on the upper end of rod 54, and with the cam 45 holding the electrode 38 in retracted position, the operator can lift the foot 51 by the knob 55 and then allow the spring 52 to bring about resilient clamping of the mounting by the foot 51 against the table 40. Should it be found desirable to remove a pin, the lead 39 may be transferred to the plunger 50, which is electrically insulated from the press member 43, and attached thereto as indicated in broken lines in Fig. IX. This permits heating of the attachment to soften the solder 37 while the electrode 38 is in retracted position, out of the way of the pin being removed.

In accordance with my invention no flux is employed with the solder 37. In fact the tenacity of the solder connection does not depend upon surface adhesion to the sleeve 26 or pin 27. Instead I provide internal irregularities in the sleeve 26 such as shown at 56 in Fig. II so that the heat softened solder fills the depressions and thereby is anchored within the sleeve 26 upon re-hardening. It is within the contemplation of my invention to thus soften the solder 37 and anchor it within the sleeve 26 either as a preliminary step or at the time the pin is telescoped with the sleeve to secure the lens in the mounting. Certain considerations, such as economy, favor the supplying of a pellet of solder with each pair of members 26 and 27, the solder being softened at the time the assembling is done. Other considerations, such as convenience for the operator, favor supplying to the latter a sleeve having the solder already anchored therein. In any case the pin 27 completes an electric circuit from the lead 39 and electrode 38 through the solder, the sleeve 26, and the table 40 to the lead 41. Sufficient current is supplied to heat the solder or like binding material to its softening point. As above set forth, the spring 44 automatically maintains a direct pressure upon the pin 27 while the current heats up the material 37; and when the softening point of this material is reached, he notices that the pin 27 sinks down until its head rests on the strap 31.

If the proper amount of solder or like binding material has been provided, the space between the irregular inner surface of the sleeve 26 and the exterior of the pin 27 is filled with binding material 37. In according with my invention no flux is used; and instead of a pin which is cylindrical or smoothly tapered, I provide an exterior surface which becomes embedded in the material 37.

I find it convenient to form the desired irregularities in the interior of the sleeve 26 by a threading operation. Such a threading operation can be performed while producing minimum weakening of the wall of the sleeve by using a tap which forms shallow grooves. If the pin be grooved, it is not necessary to so closely restrict the size of the indentations in its exterior; and in accordance with the embodiment shown in Fig. II, I form a vertical series of annual grooves 57 on the periphery of the pin 27. It will be understood that if a more slender pin and a thicker walled sleeve are employed, the threads or other corrugations in the sleeve may be wider and deeper. In any event, the softening of the material 37 by heat permits the pin 27 to make its way down into the mass of material 37 so as to become embedded therein. I prefer that there be no surplus of the material 37; but if there be any surplus, it fills the perforation 35, and may even overflow between the head of the pin 27 and the outer surface of strap 31 without real damage. As no flux is employed, this excess of material 37 can be readily dislodged leaving an attractive finish.

Various materials may be employed as the binding material 37, for instance, quick hardening cements, quick hardening amalgams, quick hardening organic plastics which do not adhere tenaciously to precious metals, and alloys whether or not they are ordinarily considered as solders but which have a sufficiently low softening point to be softenable without endangering the lens in the mounting. In the case of a binding material which is not electrically conducting, the lead 39 is transferred to the plunger 50 for heating to the softening temperature of the material, and the pin is merely pushed into the container or sleeve by the member 38.

The preferred binding material is an alloy such as a solder containing sixty parts by weight of lead and forty parts tin, a solder containing 33.3 parts by weight tin, 33.4 parts by weight lead and 33.3 parts bismuth, or a solder containing 25 parts by weight tin, 25 parts by weight bismuth and 50 parts by weight lead. The first of the three solders just mentioned has the highest melting point, 360° F., the second has the lowest melting point, 253° F., and the third has an intermediate melting point, 300° F. While a low melting point has obvious advantages, the others mentioned are entirely practical. Here the criterion of how much resistance the connection has to rupture is not the adhesive qualities of the solder but its strength in resisting shear. The third of the three solders with its high lead content is admirably fitted to stand up against shear.

In accordance with the particular form shown in Fig. II, the head of the pin 27 leaves a slight gap between itself and the strap for purposes of disassembly. That is, if it becomes desirable to remove the lens 15 from its attachment, the mounting may be placed on the table 40 and by passing electric current through the telescoping members 26 and 27 by means of the plunger 50 as above explained, the material 37 can be resoftened so as to permit lifting the pin 27 out of the strap 31 by inserting a tool under the head of the pin 27.

In the embodiment illustrated in Fig. III, the lens 15 is in somewhat similar manner secured to straps 30a and 31 by telescoping members locked together by heat softenable material 37. This figure illustrates a pair of straps which may alternatively be connected to the lens 15 by a screw, the screw threads being indicated at 59. The sleeve or container 60 is substantially similar to the sleeve 26 of Fig. II, although somewhat shorter in length. Instead of entering the perforation in the opposite strap the sleeve 60 stops short of the opposite strap and closely fits the shank 61 of the pin 62. As shown, the pin 62 is of somewhat larger cross section than pin 27 and the shank 61 is somewhat larger than its portion which is embedded in the material 37. This latter portion is roughened in any suitable way so as to cause the pin 62 to become embedded in the material 37 as the latter hardens. As shown, the pin 62 has a corrugated exterior substantially from its shank 61 to its tip. The interior of the sleeve 60 is provided with irregularities 56 of the type described in connection with Fig. II. The mounting will be inverted from its Fig. III position for softening the material 37.

With this form of attachment for a lens the amount of solder or like binding material inserted in the sleeve 60 should be more accurately measured than with the form shown in Fig. II. It is desirable that as much as possible of the roughened portion of the pin 62 be embedded in the material 37, while it is also desirable that a minimum amount of material 37 be extruded past the shank 61 into the space between the shank 61 and the opposed surface of the lens in the perforation 28.

With this form of mount, the telescoping members 60 and 62 are substantially flush with the exposed surface of the straps 30a and 31. The threaded perforation 59 can be slightly countersunk if necessary to admit the head of the pin 62. The perforation in the strap 31 can be countersunk at 33 to admit the head or closed end of the container 60.

Fig. IV illustrates a modification of the embodiment illustrated in Fig. II. Here the sleeve or container 26 extends through the perforated strap 30 into a perforation 63 in the opposite strap 31a. The perforation 63 is countersunk not to admit the head of the pin 64 but to receive the overflow of solder or other binding material 37. The pin 64 is considerably decreased in size as compared with the pins 27 and 62. In fact the pin 64 telescopes to a considerably less extent with the sleeve 26, and has normally no direct contact with the strap 31a.

A sufficient quantity of solder or like binding material is moulded within the container 26 so that when the pin 64 moves downwardly into position, the excess solder is moulded into the flared outer end of the perforation 63. Care must be taken not to exert any pressure on the pin 64 once it has reached the desired location relative to the remainder of the mounting, since otherwise the softened material 37 would flow out over the exposed surface of the strap 31a. If there is an excess of material 37 such excess can be dislodged after hardening of the material. The holding power of the attachment depends upon the strength of the shoulders of material 37 which extend out from the open end of the container 26 and fill the countersunk portion of the perforation 63.

In the form of my invention, shown in Fig. V, the pin 64a is substantially similar to the pin 64. The sleeve or container differs in this form from the one shown in Figs. II and IV. In Fig. V, the sleeve is in two parts, 65 and 66, both of which have the irregularities 56 on their interior. The part 65 has a closure or head which is seated in the countersunk portion of the perforation 33. The exposed end of the part 66 is outwardly flared to engage the countersunk portion of the perforation 63. The sum of the two parts 65 and 66 should be substantially the length, determined by the thickness of the lens 15, which will permit the head of the part 65 and flared end of the part 66 to engage the above mentioned countersunk portions of the perforations 33 and 63. They should not have a combined length which exceeds this permissible length. If their combined length is too short, material 37 will tend to excude from their adjacent ends so as to interfere with rocking movement of the lens 15 relative to the straps. In this embodiment the solder or like binding material should preferably be inserted and softened when the parts of the ophthalmic mounting are assembled. The purpose of the pin 64a is principally to provide an attractive finish, since it does not have the function of reinforcing the shoulders of material 37 to the same extent as it is true in the embodiment shown in Fig. IV. However, it is desirable to roughen the pin 64a as shown.

It is not necessary that the pin fit loosely within the open end of the container as in Fig. V. Fig. VI shows a modification of this form of my invention according to which the part 65 of the container remains the same and cooperates with a part 66a which is similar to the part 66 in engaging the countersunk end of the perforation 63, but differs from the part 66 in providing a shoulder 67 against which the head 68 of the pin 69 rests when the parts are in locking position. This form of my invention does not permit as much leeway in the amount of binding material 37 as does the form illustrated in Fig. V. It has the advantage, however, that there is a smooth finish to the strap 31a and no solder is exposed to view.

Figs. VII and XII illustrate an embodiment of my invention which permits considerable leeway in the quantity of solder inserted. Moreover, an attractive finish is provided for both straps, and no solder is exposed to view. Again I employ a pair of telescoping members 70 and 71. The outer of the pair of telescoping members 70 is substantially similar to the part 65 illustrated in Figs. V and VI. Its closed end or head engages the countersunk portion of the perforation 33 in the strap 30. The inner member 71 is hollowed out through the greater portion of its length as indicated at 72. The inner walls of both the member 70 and the member 71 are provided with irregularities 56 so as to anchor the material 37 thereto. The member 71 is provided with a reduced sleeve-like portion 73 which telescopes with the member 70. The length of the portion of the member 71, which is thus reduced depends upon the thickness of the lens 15 which is to be secured.

As illustrated in Fig. XII the parts are assembled with a pellet or a section of a rod of material 37 received within the members 70 and 71. As shown in Fig. XII, the reduced portion 73 is just started within the member 70. The electrode 38, resting upon the head of the member 71, brings about current flow so as to heat the material 37 to the softening point, when it reshapes itself to fill the cavities in the members 70 and 71, flow up in the space surrounding the reduced portion 73, and if necessary exude out from between the telescoping members 70 and 71 as illustrated in Fig. VII. In order to avoid an air pocket beneath the head of the member 71, the latter if it is found desirable may be perforated at 74 to provide a vent. This form of my invention does not require the nicety of measurement of the quantity of material 37 nor the exact dimensioning of the telescoping parts that is required with forms of my invention illustrated in Figs. III to VI inclusive.

In the form of my invention, shown in Fig. VIII, the telescoping members 75 and 76 perform substantially the same functions as in the forms shown in Figs. II and VII. The member 75 is substantially similar to the member 70 except that it is long enough to engage in the perforation 77 in the strap 31 when the two members are fully telescoped. The inner member 76 includes a head which engages the countersunk portion of the perforation 77 in the strap 31. The interior of the member 76 is hollowed out somewhat after the fashion of member 71. The interior of the member 75 is provided with irregularities 56 and the wall or telescoping portion of the member 76 is perforated to permit the material 37 to flow through and interlock the telescoping members. It is desirable therefore, that the telescoping portion of the member 76 be considerably elongated while leaving enough leeway at its end to take care of the usual variations in thickness of the lens 15. A perforation 74 may be provided if desired for avoiding trapping of air. Moreover, the head of the member 76 may be reduced in depth if a greater extent of overlapping of the two members 75 and 76 is desired.

Fig. IX illustrates a modification of the form of my invention shown in Fig. II. The sleeve or container 26 is substantially identical with the corresponding member shown in Fig. II. The perforation 35a differs from the perforation 35 in that a shoulder 78 is provided against which seats the head 79 on the pin 27a. This form of head provides a somewhat smoother finish. The pin 27a has but a single wide groove so that in effect it is of reduced cross section through the greater part of its length and ends in a head 57a which is embedded in the material 37. As the failure point is reached when enough pull is brought to bear to shear the material 37, one enlargement such as the head 57a is approximately as effective as a series of ribs.

Fig. X illustrates the embodiment of my invention illustrated in Fig. IV as applied to a single strap construction. Opposite the single strap 31b is a washer 80 having the countersunk perforation 33 which cooperates with the head of the member 26. The various forms of my invention have the advantage that telescoping members provide a pivot about which slight rocking movements of the lens 15 may take place. The binding material 37 is confined so as not to lock the lens 15 against such movement.

The manner of moulding the material 37 is so simple that a minimum of training and skill is required for success. All that is needed, in order to judge how long to continue the current flow for heating, is to watch until the pin 27 or the like moves downwardly. The eye is quick to see such a movement; and therefore even a relatively careless operator has a greater chance of success than with the type of mounting where the operation is hidden and a fair degree of judgment is required for success. The doing away with the flux for the solder is a substantial advantage. The flux in conjunction with moisture finding its way into parts treated with the flux may bring about corrosion of these parts so as to give an unsightly appearance. Moreover, the flux is responsible for troublesome gases during soldering, so that following the teaching of the present application makes it easier to keep the material 37 confined as it should be.

The tenacity of the connection is not dependent upon the success in obtaining adhesion of the solder to the surface of the telescoping members, and indeed such surface adhesion is not aimed at. Instead there is a true anchoring or locking of the parts together, since the heat softened material 37 is moulded into the irregularities of the opposed surfaces of the telescoping members. Tests have shown that anchoring the material 37 to both of the telescoping members results in such a tenacious connection, that one or the other of the telescoping members is apt to rupture before being pulled loose from the binding material 37.

While I have illustrated and described a number of embodiments of my invention, it will be understood that my invention may be otherwise embodied and practiced within the scope of the following claims:

I claim:

1. In an ophthalmic mounting, a perforated lens, a lens strap having openings aligned with the perforation in the lens, and a device extending through said openings and perforation for uniting said parts comprising a sleeve closed at one end, said end being engaged in one of the openings in said lens strap, binding material held within said sleeve and having an enlargement disposed within the other of the openings in the lens strap, and a pin extending into and embedded in said binding material.

2. In an ophthalmic mounting, a lens with an opening therein, a lens strap having openings aligned with said opening in the lens, one of said strap openings having an enlargement, and means in said openings for uniting said parts comprising a sleeve closed at one end and received in said opening in the lens, binding material held within said sleeve and extending out into said enlargement in one of the strap openings, said sleeve engaging in the other of said strap openings for holding the strap to the lens, and a closure member for the open end of the sleeve held to said binding material.

3. In an ophthalmic mounting, a perforated lens, a lens strap having elements overlying opposite faces of the lens and an element integral with at least one of the first mentioned elements overlying the edge of the lens and spaced therefrom, resilient means on said portion overlying the edge of the lens and biasing the lens strap away from said lens edge, and a device in the perforation in said lens for connecting the strap to the lens while permitting pivotal movement therebetween about said perforation, said device when assembled comprising an elongate member of heat softenable material enlarged at one end, said enlarged end being mounted in an opening in one of said first mentioned elements, and a sleeve confining the body portion of said elongate member so as to prevent said heat softenable material from interlocking with the lens, there being interfitting irregularities on said sleeve and on said member by means of which said member is anchored in said sleeve other than by surface adhesion, said sleeve being carried by the other of said first mentioned elements so as to project into the perforation in the lens.

4. In an ophthalmic mounting, a perforated lens, a lens strap having elements overlying opposite faces of the lens and an element integral with at least one of the first mentioned elements overlying the edge of the lens and spaced therefrom, one of said first mentioned elements carrying a tubular member projecting into the perforation in the lens and the other of said elements carrying a projection consisting essentially of heat softenable material extending within said tubular member and anchored within said tubular member, said tubular member surrounding said softenable material so as to prevent it from interlocking with the lens to provide a positive but free working pivotal connection whereby the strap, because of said spacing, is pivotally free to move relative to said lens.

5. In an ophthalmic mounting, a perforated lens, a lens strap having elements overlying opposite faces of the lens and an element integral with at least one of the first mentioned elements overlying the edge of the lens and spaced therefrom, a tubular member held in an opening in one of said first mentioned elements so as to project into the perforation in the lens and extending to adjacent the other of said elements, and means held in an opening in the last mentioned element and extending into said tubular member for uniting the elements of said strap with the lens comprising an elongate member of heat softenable material anchored in said tubular member by interfitting irregularities on said material and on said tubular member.

6. In an ophthalmic mounting, the combination as claimed in claim 5 in which said means for uniting the elements of the strap with the lens comprises a pin embedded in at least the outer end portion of said elongate member of softenable material.

7. In an ophthalmic mounting, a perforated lens, a lens strap having elements overlying opposite faces of the lens and an element integral with at least one of the first mentioned elements overlying the edge of the lens and spaced therefrom, one of said first mentioned elements carrying a tubular member projecting into the perforation in the lens and the other of said elements carrying a projection consisting essentially of heat softenable material extending within said tubular member and anchored within said tubular member, said tubular member surrounding said softenable material so as to prevent it from interlocking with the lens to provide a positive but free working pivotal connection whereby the strap, because of said spacing, is pivotally free to move relative to said lens and resilient means on said element overlying the edge of the lens for resiliently limiting the pivotal movement of said lens strap relative to said lens.

8. A device for uniting parts of an ophthalmic mounting, comprising a sleeve closed at one end, binding material held within said sleeve, and a pin extending through the other end of said sleeve and terminating short of said closed end of the sleeve, said pin having its inner end embedded in said material, said sleeve and pin having portions for engaging parts of an ophthalmic mounting and holding them in place, said binding material interengaging with both the inner surface of the sleeve and the opposed surface of the pin so as to be mechanically anchored to both the pin and the sleeve and lying about the head of said pin to form an enlargement at the respective end of said device.

9. In an ophthalmic mounting, connecting means for uniting a perforated lens with a lens strap having elements adapted to overlie opposite faces of the lens and an element integral with at least one of the first mentioned elements adapted to overlie the edge of the lens, said connecting means comprising a tubular member to be held in an opening in one of said first mentioned elements so as to project into the perforation in the lens and to extend to adjacent the other of said elements, and a second connecting member to be held in an opening in the last mentioned element and to extend into said tubular member for uniting the elements of said strap with the lens and heat softenable material in said tubular member adapted to be heated so as to allow the second connecting member to be embedded therein and simultaneously moved into telescoped relation with the tubular member and, in so doing, produce an elongate member of said heat softenable material in said tubular member for anchoring said second connecting member therein by interfitting irregularities on said material and on said tubular member.

10. In an ophthalmic mounting, a perforated lens, a lens strap having elements overlying the opposite faces of the lens with openings in substantial alignment with the perforation in the lens with at least one of said first mentioned elements overlying the edge of the lens and connecting means comprising a tubular member extending into the opening of one of said elements through the perforation in the lens and partially into the opening of the other of said elements and having means for engaging the first element, heat softenable means in said tubular member and a second connecting member having engagement means thereon, said second connecting member extending into the opening of the second element and embedded in the heat softenable material in said tubular member by subjecting said tubular member to heat of an amount sufficient to allow said second connecting member to be embedded in said heat softenable material and be positioned in telescoped relation with said tubular member with its engagement means engaging said second element and, when the said members are cool, producing an elongate member of heat softenable material anchoring said second connecting member in said tubular member, the extension of said tubular member from one of said elements partially into the opening in the other of said elements functioning as shunt means for preventing said heat softenable material from flowing into engagement with the wall of the perforation in the lens.

11. The method of connecting parts of an ophthalmic mounting having aligned openings therein comprising placing a cup-like sleeve member having engagement means thereon and a requisite amount of heat softenable binding means in said aligned openings of said parts and engaging the engagement means with the adjacent part, placing a connecting member having engagement means thereon in said aligned openings from the other side of said parts with the end thereof engaging the heat softenable binding means in said cup-like sleeve member, subjecting said members to heat to soften said binding means sufficiently to allow the connecting member to be embedded in said binding means and gauging the shutting off of said heat by the movement of the engagement means of said connecting member into engagement with the adjacent part.

12. In a method of uniting a lens and a lens strap having a connection opening therein, the steps consisting in forming an opening in the lens in substantial alignment with the connection opening in said strap, placing an elongate member of heat softenable material in said aligned openings while confining said material by a sleeve-like connecting member, placing another connecting member in said openings from the side opposite the sleeve-like member and partially into the adjacent open end of said member and applying heat to said connecting members of an amount sufficient to soften the heat softenable material to allow said second connecting member to be moved into said material and into telescoped relation with said sleeve-like member and shutting off the heat and holding the said members in alignment in said openings to bring about a cooling and joining of said connecting members.

13. An ophthalmic mounting embodying a lens having perforations therein, a bridge member for holding said lens in spaced alignment with another lens of said mounting, and a temple support, said bridge member and temple support being connected to said lens by lens holding means having elements overlying the opposite faces of the lens with openings in substantial alignment with the perforations in the lens with at least one of said first mentioned elements overlying the edge of the lens and connecting means comprising a tubular member extending into the opening of one of said elements through the perforation in the lens and partially into the opening of the other of said elements and having an enlarged head portion for engaging the first element, heat softenable means in said connecting member and a second connecting member having an enlarged head portion, said second connecting member extending into the opening of the second element and embedded in the heat softenable material in said tubular member by subjecting said tubular member to heat of an amount sufficient to allow said second connecting member to be embedded in said heat softenable material and be positioned in telescoped relation with said tubular member with its enlarged head engaging said second element, and, when said members are cool, producing an elongate member of heat softenable material connecting said second connecting member in said tubular member, the extension of said tubular member from one of said elements functioning as shunt means for preventing said heat softenable material from flowing into engagement with the wall of the perforation in the lens.

EDWARD M. SPLAINE.